Oct. 20, 1931. C. F. M. VAN BERKEL 1,827,918
COMBINED SLICING AND WEIGHING MACHINE
Filed April 30, 1928 2 Sheets-Sheet 2
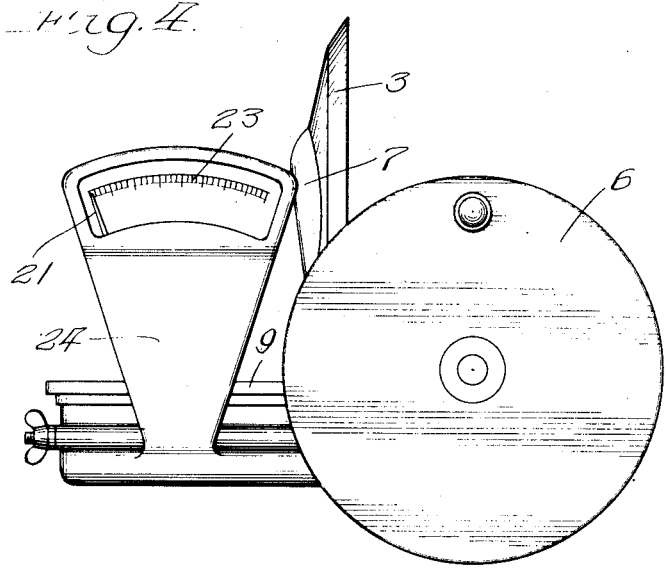
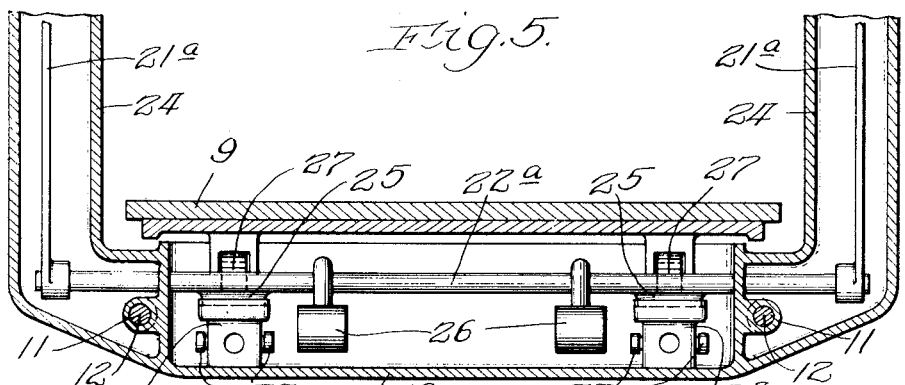
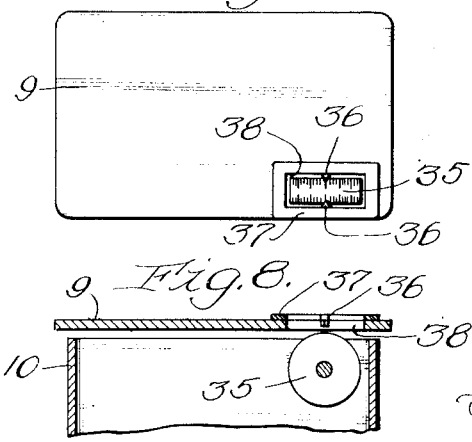
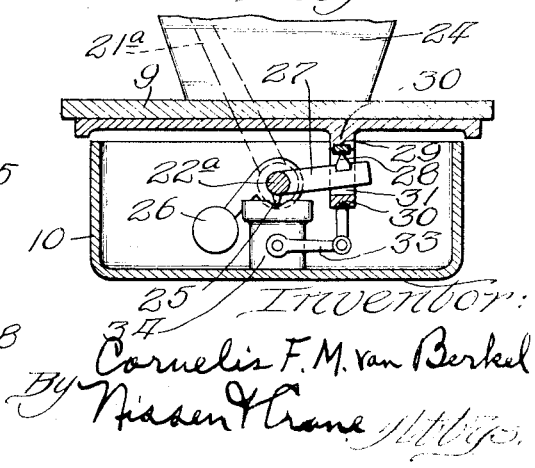

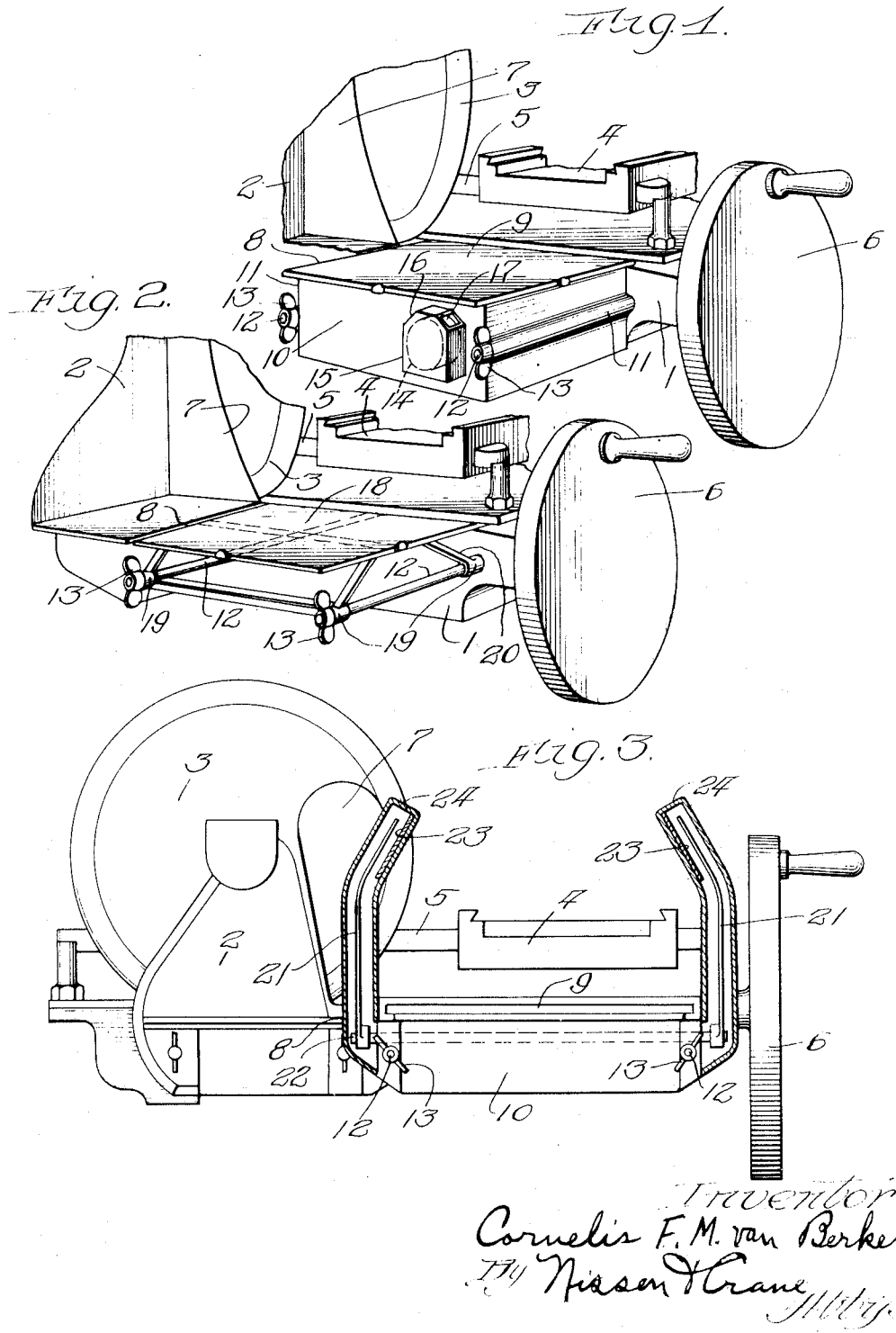

Patented Oct. 20, 1931

1,827,918

UNITED STATES PATENT OFFICE

CORNELIS F. M. VAN BERKEL, OF WASSENAAR, NETHERLANDS, ASSIGNOR TO U. S. SLICING MACHINE COMPANY, OF LA PORTE, INDIANA, A CORPORATION OF INDIANA

COMBINED SLICING AND WEIGHING MACHINE

Application filed April 30, 1928, Serial No. 273,933, and in Great Britain May 5, 1927.

This invention relates to slicing machines and has particular reference to such machines provided with an automatic weighing device.

According to the present invention, I provide a self-contained weighing device for use in slicing machines, the said weighing device in the form of a closed rectangular box capable of being located at the side of the slicing machine, the top or platform of which constitutes a table and the slicing machine or weighing device being provided with holding means whereby the weighing device can be readily fastened to or removed from the slicing machine. In accordance with a further feature of my invention, an ordinary receiving table to receive the slices as they are cut can be readily substituted in place of the weighing device, and vice versa.

The whole of the weighing mechanism including indicating means may be located beneath and confined to the area of the platform, the latter being provided with an opening, or made transparent, or made with a transparent panel so as to make the indicating means visible.

Several modifications of my invention, as applied to a slicing machine having a rotary cutter or knife, will now be described by way of example and with reference to the annexed drawings, in which—

Fig. 1 is a perspective view showing part of a slicing machine and one form of weighing device, with holding means therefor;

Fig. 2 is a view corresponding to Fig. 1 but with the weighing device substituted by an ordinary receiving table;

Fig. 3 is a side elevation of a modified weighing device with holding means and showing part of the respective slicing machine;

Fig. 4 is a view of the arrangement in Fig. 3 looking from the right of said figure;

Fig. 5 is a side elevation, partly in section, of a further modification of weighing device, with holding means and showing part of the slicing machine;

Fig. 6 is a section of the weighing device in Fig. 5 taken on a vertical line through the center thereof and looking from the right of Fig. 5;

Fig. 7 is a plan view of the weighing device wherein the indicator, as well as the weighing mechanism, is disposed below and within the area of the platform; and Fig. 8 is a partial section of the device in Fig. 7, through the indicator.

Referring to the drawings, the slicing machine, as usual, comprises a base 1 provided with a bracket 2 in a bearing on which the circular knife 3 is rotatably mounted. A reciprocating carriage 4 is mounted on guides 5, the knife 3 and carriage 4 being operated by the hand wheel 6. A guide plate 7 is provided for guiding the material sliced by the knife 3, on its discharge from the machine.

On the same side of the machine as the guide plate 7, a recess 8 is provided for the reception of a weighing device comprising a platform 9 and a box 10 containing the weighing mechanism. The two sides of the box 10 are each formed with an extended boss 11, and the base 1 of the machine is provided with long projecting studs 12. The bosses 11 and studs 12 are so arranged that they are capable of engagement with each other, the studs being of such a length that, when the box is carried thereby so that it rests against the adjacent side of the base 1, wing-nuts 13 can be screwed onto the outer ends of the studs so as to hold the weighing device in position.

At the front of the box 10, an indicator is provided comprising a drum 14 rotatable within a cover 15 and graduated with different scales adapted to co-operate with two indices disposed respectively in the apertures 16 and 17, one index and scale being for the salesmen and the other index and scale for the buyer.

The mode of attachment of the weighing device 10, 11 to the base 1 of the slicing machine, as described above, allows the said device to be readily removed or replaced, and permits the substitution of the weighing device by an ordinary receiving table 18, as shown in Fig. 2. This table, in the construction shown, essentially comprises bosses such as 19, whereby it may be supported by the studs 12. The bosses 19 may form part of any light frame such as 20, adapted to hold the table 18 rigidly in place.

In the arrangement shown in Fig. 3, the weighing device 10, 11 is detachably secured to the slicing machine, as before, by studs 12, bosses 11 and wing-nuts 13, but it is provided with indicating mechanism more readily visible to the salesman and buyer than that illustrated in Fig. 1. This indicating mechanism comprises a pair of similar pointers 21 disposed at the opposite ends of the oscillating shaft 22, and adapted to co-operate with graduated scales 23 arranged inside casings 24. The said casings 24 constitute the sides of the box 10 of the weighing device, and are consequently formed with extended bosses 11 through which the studs 12 pass. As will be seen from Fig. 3, each casing 24 and pointer 21 is bent inwards over the platform 9 at its upper end, so that the reading of the pointers on the scales 23 will be clearly visible to the salesman or buyer. The foregoing indicating mechanism in no way interferes with the operation of the weighing device or slicing machine, the slices, when cut, being guided on o the platform 9 by the guide plate 7, and being withdrawn afterwards from the platform at the side opposite to the knife 3.

In the arrangement shown in Figs. 5 and 6, the attachment of the weighing device is substantially the same as that shown in Figs. 3 and 4, but the indicating mechanism in this arrangement is of simpler design, the pointers 21ª mounted on the oscillating shaft 22ª being straight and of more compact form than those shown in Figs. 3 and 4, and those pointers being mounted in upright casings 24 adapted to form the sides of the box 10. As in the previous instance, the casings 24 are formed with extended bosses 11 for the reception of the attachment studs 12.

Figs. 5 and 6 also illustrate the mechanism of the weighing device inside the box 10. This mechanism comprises an oscillating shaft 22ª mounted on knife edges 25 and fitted with pendulous resistants 26. The shaft 22ª is also provided at the knife edges thereof with levers 27 which, in turn, carry knife edges 28 on which rest agate-stones 29. The said agate-stones are mounted in projections 30 formed upon or secured rigidly to the under surface of the platform 9. An aperture 31 is provided in each of the projections 30, through which aperture, the relative lever 27 passes. At the bottom ends of each projection 30, a pivoted joint 32 connects said projection to a pair of rocking links 33 mounted on the pedestal 34 of the respective knife edge 25, and acting as check mechanism.

The modification of the invention shown in Figs. 7 and 8 comprises a weighing device in which the indicating means, as well as the weighing mechanism, is located beneath the platform 8 and within the area thereof. The said indicating means consists of a graduated drum 35 mounted upon or in gear with the oscillating shaft of the weighing mechanism, not shown. The graduations on the drum 35 co-operate with indexes 36 carried by and projecting inwards from the edges of a transparent panel 37 enclosing an opening 38 formed in the platform 8. If desired, two such indicators may be provided, one in a position convenient for the salesman and the other in a position convenient for the buyer.

It will be apparent that in each of the modifications particularly described, the removal of the weighing device, and its replacement, if desired, by an ordinary receiving table, can be carried out in a minimum of time and without the use of tools.

I claim:—

1. The combination with a slicing machine having a slicing knife, of a complete weighing unit, co-operating elements on said slicing machine and weighing device to detachably secure said weighing device on said slicing machine in position to receive the slices formed by said knife.

2. The combination with a slicing machine having a slicing knife, of a complete weighing unit having bosses thereon, said slicing machine having studs fixed thereto and projecting therefrom slidably receiving said bosses, said studs being located on said machine to place said weighing device in position to receive the slices formed by said knife, and nuts on said studs to detachably secure said weighing device to said slicing machine.

3. The combination with a slicing machine having a slicing knife, of a weighing device comprising a platform and a box-like structure containing weighing mechanism disposed beneath said platform, said weighing device being detachably secured to said machine to position said platform adjacent said knife, and a scale indicator positioned to be read from one side of said weighing device and a second scale indicator positioned to be read from the other side of said weighing device.

4. The combination with a slicing machine having a slicing knife, of a weighing device comprising a platform and a box-like structure containing weighing mechanism disposed beneath said platform, said weighing device being detachably secured to said machine to position said platform adjacent said knife, and an upstanding, casing containing scale indicating means, extending from opposite ends of said box-like structure.

5. The combination with a slicing machine having a slicing knife, of a weighing device comprising a platform and a box-like structure containing weighing mechanism disposed beneath said platform, said weighing device being detachably secured to said machine to position said platform adjacent said knife, and an upstanding casing extending from opposite ends of said box-like structure, a shaft operatively connected with said platform and extending through said box-like structure at each end thereof into said casings, a pointer mounted on each end of said shaft and extending vertically upward into said casings, and a scale at the upper ends of said casings co-operating with said pointers.

6. The combination with a slicing machine having a slicing knife, of a weighing device comprising a platform and a box-like structure containing weighing mechanism disposed beneath said platform, said weighing device being detachably secured to said machine to position said platform adjacent said knife, and an upstanding casing extending from opposite ends of said box-like structure, said casings including vertical portions and top portions inclined toward each other, and scale indicating means positioned in said top-inclined portions of said casing.

7. The combination with a slicing machine having a slicing knife, of a weighing device comprising a platform and a box-like structure containing weighing mechanism disposed beneath said platform, said weighing device being detachably secured to said machine to position said platform adjacent said knife, and an upstanding casing extending from opposite ends of said box-like structure, said casings including vertical portions and top portions inclined toward each other, a scale positioned in each of said inclined portions; a shaft operatively connected with said platform and extending through said box-like structure at each end thereof into said casings, a pointer mounted on each end of said shaft, said pointer having a vertical portion and an inclined portion to co-operate with said scale.

8. The combination with a slicing machine having a slicing knife, of a weighing device comprising a platform and a box-like structure containing weighing mechanism disposed beneath said platform, said weighing device being detachably secured to said machine to position said platform adjacent said knife, and a scale indicator mounted on said box-like structure beneath said platform, said platform being provided with a transparent opening to make said scale indicator visible.

9. In combination, a slicing machine having a slicing knife and a work support, and a weighing unit supported by said slicing machine in predetermined relation thereto and detachable therefrom as a unit, said weighing unit when in operative position being adapted to receive slices as they are cut by said knife.

In testimony whereof I have signed my name to this specification on this 16th day of April, A. D. 1928.

CORNELIS F. M. van BERKEL.